March 29, 1949.   R. N. GRIESHEIMER   2,465,683
RADIO-FREQUENCY POWER MEASURING BRIDGE
Filed July 9, 1945

INVENTOR
RUDOLPH N. GRIESHEIMER
BY William D. Hall.
ATTORNEY

Patented Mar. 29, 1949

2,465,683

UNITED STATES PATENT OFFICE 2,465,683

RADIO-FREQUENCY POWER MEASURING BRIDGE

Rudolph N. Griesheimer, Belmont, Mass., assignor, by mesne assignments, to the United States of America as represented by the Secretary of War Application July 9, 1945, Serial No. 604,031

6 Claims. (Cl. 171—95)

This invention relates generally to an electrical circuit and more particularly to a power measuring circuit.

In measuring radio frequency (R.-F.) power one method employs a bridge network containing three fixed resistors and a temperature sensitive resistor. The temperature sensitive resistor may be of the thermistor type, a substance including nickel, manganese and cobalt. The electrical resistance of the thermistor increases approximately exponentially as the internal temperature of the resistive element of the thermistor decreases. The bead type thermistor may be used as a temperature sensitive resistance, its resistance being controlled primarily by an electrical power input from the bridge power supply. The internal temperature and resistance of the bead thermistor will also be a function of the ambient temperature and a function of the R.-F. power dissipated in the bead.

The disk type thermistor is intended for use as a temperature sensitive resistance, its resistance being controlled primarily by the ambient temperature. The composition of the disk thermistor is similar to that of the bead thermistor. The principal difference between the two is the greater thermal mass of the disk. The current through the disk is not sufficient to appreciably alter the resistance of the disk and hence its resistance depends primarily upon the ambient temperature.

When zero R.-F. power is supplied to the bead thermistor, the bridge may be balanced for a definite ambient temperature by adjusting a D.-C. balancing voltage input to the bridge. When the proper D.-C. current flows through the thermistor bead to bring it to the correct internal temperature and therefore resistance, the bridge will balance. Such a balanced condition is indicated by zero current flowing through a D.-C. microammeter in the output of the bridge circuit. When radio frequency power is now applied to the thermistor bead, the resistance of the bead will change, the bridge will become unbalanced and the microammeter may be calibrated to indicate directly the value of radio frequency power.

If the room temperature changes, the internal temperature of the thermistor bead will change and the bridge must be rebalanced for zero R.-F. input. For example, when the temperature decreases, greater D.-C. potential must be applied to the bridge to allow more current to flow through the thermistor bead and bring the resistance of the thermistor bead back to the correct value. The temperature coefficient of resistance of the bead is many times that of the other fixed resistors in the bridge circuit. Zero drift is the first type of error associated with an ambient temperature change in the thermistor bead type bridge.

In correcting the above error by increasing the applied D.-C. balancing voltage to the bridge, the sensitivity of the bridge changes. This occurs primarily because any unbalance resulting from an applied R.-F. power will cause more current to flow through the microammeter because a greater D.-C. voltage than was used originally to balance the bridge is necessary for rebalancing. The calibrated microammeter will therefore indicate an amount of power greater than the true R.-F. power. Bridge sensitivity also depends upon the D.-C. supply voltage impedance of the bridge. Usually the supply voltage impedance is made variable over a region where the sensitivity changes but little. A third factor affecting the bridge sensitivity depends upon the constant K associated with the thermistor. The constant K is a function of the resistance of the thermistor. By forcing the thermistor to operate on the same ambient characteristic where its value of K is always the same at balance, sensitivity errors due to the shifting of the value of the constant K may be eliminated. Loss in sensitivity, due primarily to the first of the above-mentioned conditions, is the second type error associated with the thermistor bead type bridge network.

It is an object of this invention to provide automatic compensating means for correcting zero drift in a thermistor bead bridge network resulting from temperature changes. Another object is to provide automatic compensating means for correcting sensitivity shifting errors in a thermistor bead bridge network resulting from rebalancing the bridge due to temperature changes. A further object is to provide a final manual means for trimming the bridge balance adjustment.

Other objects, features, and advantages of this invention will suggest themselves to those skilled in the art and will become apparent from the following description of the invention taken in connection with the accompanying drawing in which.

Figure 1:
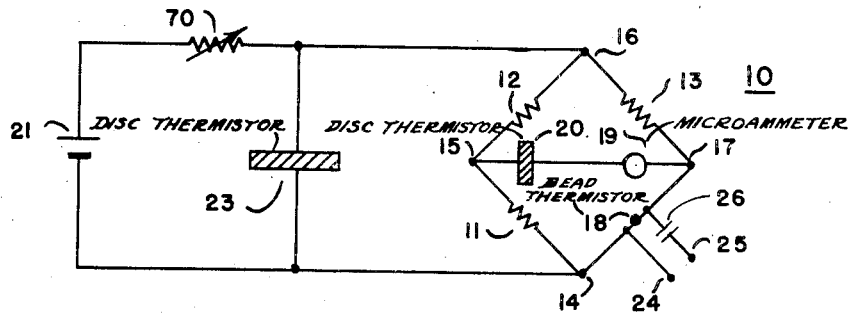
Fig. 1 is a circuit diagram embodying the principles of this invention.

Referring more specifically to Fig. 1, there is shown a bridge network 10 consisting of three fixed resistors 11, 12, and 13 connected between terminals 14 and 15, 15 and 16, and 16 and 17, respectively, and a thermistor bead 18 connected between terminals 14 and 17. Microammeter 19 in series with thermistor disk 20 is connected between terminals 15 and 17. A D.-C. potential from source 21 is applied through a variable resistor 70 to terminals 14 and 16 of bridge 10. Also connected between terminals 14 and 16 is a second thermistor disk 23. The radio frequency power to be measured is applied across terminals 24 and 25 through coupling condenser 26 to thermistor bead 18.

It is evident that the D.-C. voltage from source 21 is apportioned, part of it appearing across variable resistor 70 and the remainder appearing across terminals 14 and 16 of the bridge. The thermistor disk 23 serves as a variable shunt across terminals 14 and 15 and hence determines the D.-C. voltage applied across the bridge terminals. For example, if the room temperature decreases, a larger voltage is needed across terminals 14 and 16 for bridge balance. The resistance of thermistor disk 23 rises and increases the applied D.-C. balancing potential across the bridge. Approximately zero drift correction is achieved automatically with thermistor disk 23.

To correct for the change in sensitivity caused by a change in D.-C. voltage applied to bridge 10, disk 20 limits the current through microammeter 19. When in the above example, the temperature drops, the resistance of the thermistor disk 20 increases. This prevents additional current from flowing through the meter because of the increased D.-C. balancing voltage. The optimum condition would be when the decreased sensitivity resulting from the action of disk 20 would exactly balance the increased sensitivity resulting from the action of disk 23.

Figure 2:
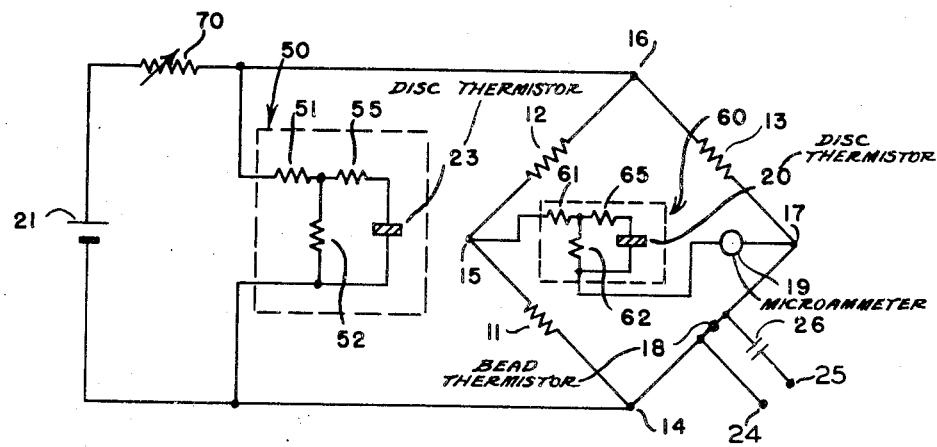
Fig. 2 is a circuit diagram of an alternate embodiment of the principles of this invention.

In the second embodiment of this invention, the circuit of which is shown in Fig. 2, the compensation is more nearly perfect. With the exception of the resistive T networks which are used to couple the disks into the bridge, the circuit shown in Fig. 2 is the same as that shown in Fig. 1.

Resistance coupling network 50 associated with disk 23 consists of three resistors 51, 52, and 55. One end of resistor 51 is connected to terminal 16 of the bridge and the opposite end of this resistor is connected to the common connection point of resistors 51, 52, and 55. The other end of resistor 55 is connected to one end of the disk thermistor 23. The other end of resistor 52 is connected to the other end of disk thermistor 23 and also to terminal 14 of the bridge.

Resistive coupling network 60 associated with thermistor disk 20 consists of three resistors 61, 62, and 65. One end of resistor 61 is connected to terminal 15 of the bridge, and the opposite end is connected to the common connection point of resistors 61, 62, and 65. The other end of resistor 65 is connected to the first end of disk thermistor 80. The opposite end of resistor 62 is connected to the second end of disk thermistor 20 and also to one side of the microammeter 19.

The values of the resistors in the coupling networks may be calculated from several parameters of the thermistors. These parameters appear in the resistance-temperature equations of bead and disk thermistors and may be determined experimentally.

In an alternate method, the values of the resistances in network 60 can be calculated from experimental curves of the resistance that must be added to the meter (as a function of temperature) in order to maintain constant sensitivity. Likewise the resistor network 50 may be calculated from experimentally-determined curves of the shunt resistance needed as a function of temperature to maintain bridge balance. Coupling network 50 must be determined and installed before coupling network 60 is calculated.

The effective temperature-resistance variations of the disk thermistors as presented to the bridge will afford more accurate compensation when the above described coupling networks are used. While a T coupling network was described in this connection, any resistive network which can be reduced to the above equivalent T network can be used.

Although it would be possible to choose values for the resistance networks and the disk thermistors which would produce almost perfect compensation for one thermistor bead, when the bridges are to be made in large quantities the resistors and disks are chosen so as to produce compensation for an average bead. The compensation will not be perfect for beads which differ from the average and for this reason there is provided a variable resistor 70 shown in Figs. 1 and 2 for small final compensating adjustment.

For accurate operation over fairly broad temperature ranges, the resistance of the bead thermistor should be relatively low at bridge balance. The lower the D.-C. resistance at bridge balance is, the less will be the effect of ambient temperature changes. The power heating the bead is primarily that due to the heating from the D.-C. power input to the bridge. The change in resistance due to changes in ambient temperature is therefore a small proportion of the change due to the D.-C. power input.

The two disk compensated thermistor bridge described in this invention is useful in R.-F. power measurements. Power is indicated directly by the meter associated with the bridge. The principal advantage is that it offers both sensitivity and drift compensation and yet is operable on D.-C. alone. For these reasons the apparatus may be made very compact and inexpensive.

Used as an unbalanced bridge this apparatus is particularly well adapted for monitoring a power source to give a continuous indication of power.

While there has been described what is at present considered to be the preferred embodiment of this invention, it will be obvious to those skilled in the art that various changes and modifications may be made therein without departing from the scope of the invention as set forth in the appended claims.

What I claim is:

1. In combination, a temperature compensated bridge network containing three constant resistors and a first temperature sensitive resistive element, the resistance of said first temperature sensitive resistive element being proportional to the temperature of said element, a means for applying an electrical power input across said first temperature sensitive resistive element, a means for applying a direct voltage through a variable resistance to said bridge, a means for regulating said direct voltage input to compensate for the effect of ambient temperature on the balance of said bridge, said regulating means being a second temperature sensitive resistive element and a first resistive coupling network, a means associated with said bridge for indicating the direct voltage output of said bridge, said indicating means being a current meter in series with a second resistive coupling network, a third temperature sensitive resistive element associated with said second resistive coupling network acting to regulate the current through said meter in accordance with the ambient temperature to compensate for a change in the sensitivity of said meter resulting from a change in the voltage of said source applied to said bridge.

2. In a bridge network containing a temperature sensitive resistive element, said bridge network having a direct voltage input, said direct voltage input being adjustable, a means for regulating said direct voltage input to compensate for the effect of ambient temperature on the balance of said bridge, said regulating means being a second temperature sensitive resistive element and a first resistive coupling network, a means associated with said bridge for indicating the direct voltage output of said bridge, said indicating means being a current meter in series with a second resistive coupling network, a third temperature sensitive resistive element associated with said second resistive coupling network acting to regulate the current through said meter in accordance with the ambient temperature to compenate for changes in the sensitivity of said meter resulting from changes in the voltage of said source applied to said bridge.

3. A measuring circuit comprising a bridge network containing three fixed resistors and a first thermistor, means to apply electrical energy to be measured as an input to said first thermistor to vary the temperature thereof and thereby the resistance thereof, a D.-C. voltage source, means to apply the voltage of said source as an input to said bridge, a D.-C. meter in the output of said bridge for indicating the balance thereof, a second thermistor in a first resistance coupling network in shunt with said voltage source for regulating the voltage thereon in accordance with the ambient temperature to compensate for the effect of ambient temperature on the balance of said bridge, and a third thermistor in a second resistance coupling network in series with said meter to regulate the current therethrough in accordance with the ambient temperature to compensate for the change of sensitivity of said meter resulting from a change in the voltage of said source applied to said bridge, the thermal mass of said second and third thermistors being such as to make them unresponsive to electrical current changes therein.

4. A measuring circuit comprising a bridge network containing three fixed resistors and a first thermistor, means to apply electrical energy to be measured as an input to said first thermistor to vary the temperature thereof and thereby the resistance thereof, a D.-C. voltage source, a variable resistor, means to connect said source in series with said variable resistor to the input of said bridge, a D.-C. meter in the output of said bridge for indicating the balance thereof, a first resistance T section having input and output terminals, said input terminals being connected across the input of said bridge, a second thermistor connected to said output terminals of said first T section, the parameter of said first T section in combination with said second thermistor being such as to regulate the voltage from said source in accordance with the ambient temperature to compensate for the effect of ambient temperature on the balance of said bridge, a second resistance T section having input and output terminals, said input terminals being connected in series with said meter in the output of said bridge, and a third thermistor connected to the output terminals of said second T section, the parameter of said second T section in combination with said third thermistor being such as to regulate the current through said meter in accordance with the ambient temperature to compensate for the change of sensitivity of said meter resulting from a change in the voltage of said source applied to said bridge, the thermal mass of said second and third thermistors being such as to make them unresponsive to electrical current changes therein.

5. A measuring circuit comprising a bridge network containing three fixed resistors and a bead-type thermistor, means to apply electrical energy to be measured as an input to said bead-type thermistor to vary the temperature thereof and thereby the resistance thereof, a D.-C. voltage source, means to apply the voltage of said source as an input to said bridge, a D.-C. meter in the output of said bridge to indicate the balance thereof, a disc-type thermistor in a first resistance coupling network in shunt with said voltage source for regulating the voltage thereof in accordance with the ambient temperature to compensate for the effect of ambient temperature on the balance of said bridge, and a second disc-type thermistor in a second resistance coupling network in series with said meter to regulate the current therethrough in accordance with the ambient temperature to compensate for the change of sensitivity of said meter resulting from a change in the voltage of said source applied to said bridge.

6. A measuring circuit comprising a bridge network containing three fixed resistors and a bead-type thermistor, means to apply electrical energy to be measured as an input to said bead-type thermistor to vary the temperature thereof and thereby the resistance thereof, a D.-C. voltage source, a variable resistor, means to connect said source in series with said variable resistor to the input of said bridge, a D.-C. meter in the output of said bridge for indicating the balance thereof, a first resistance T section having input and output terminals, said input terminals being connected across the input of said bridge, a first disc-type thermistor connected to said output terminals of said first T section, the parameter of said first T section in combination with said first thermistor being such as to regulate the voltage from said source in accordance with the ambient temperature to compensate for the effect of ambient temperature on the balance of the bridge, a second resistance T section having input and output terminals, said input terminals being connected in series with said meter in the output of said bridge, and a second disc-type thermistor connected to the output terminals of said second T section, the parameter of said second T section in combination with said second disc-type thermistor being such as to regulate in accordance with the ambient temperature the current through said meter to compensate for the change of sensitivity of said meter resulting from a change in the voltage of said source applied to said bridge.

RUDOLPH N. GRIESHEIMER.

REFERENCES CITED

The following references are of record in the file of this patent:

UNITED STATES PATENTS

| Number | Name | Date |
|---|---|---|
| 2,332,073 | Grierson | Oct. 19, 1943 |
| 2,375,988 | Gille et al. | May 15, 1945 |
| 2,417,820 | Ginzton | Mar. 25, 1947 |

FOREIGN PATENTS

| Number | Country | Date |
|---|---|---|
| 21,586 | Great Britain | 1908 |

OTHER REFERENCES

"Thermistors, Their Characteristics and Uses," by Pearson, published in Bell Laboratories Record, Dec. 1940, pp. 106–111.